United States Patent
Chou

(10) Patent No.: US 10,841,565 B2
(45) Date of Patent: Nov. 17, 2020

(54) 3D CAMERA DEVICE, 3D IMAGING METHOD, AND HUMAN FACE RECOGNITION METHOD

(71) Applicants: INTERFACE TECHNOLOGY (CHENGDU) CO., LTD., Chengdu (CN); INTERFACE OPTOELECTRONICS (SHENZHEN) CO., LTD., Shenzhen (CN); GENERAL INTERFACE SOLUTION LIMITED, Zhubei (TW)

(72) Inventor: Hsien-Ying Chou, Hsinchu (TW)

(73) Assignee: Interface Technology (ChengDu) Co., Ltd., Chengdu (CN)

( * ) Notice: Subject to any disclaimer, the term of this patent is extended or adjusted under 35 U.S.C. 154(b) by 240 days.

(21) Appl. No.: 15/942,625

(22) Filed: Apr. 2, 2018

(65) Prior Publication Data
US 2019/0182474 A1   Jun. 13, 2019

(30) Foreign Application Priority Data

Dec. 8, 2017   (CN) .......................... 2017 1 1294364

(51) Int. Cl.
| | | |
|---|---|---|
| H04N 13/271 | (2018.01) | |
| G06K 9/00 | (2006.01) | |
| G06T 7/521 | (2017.01) | |
| G06K 9/20 | (2006.01) | |
| G06K 9/62 | (2006.01) | |

(52) U.S. Cl.
CPC ....... *H04N 13/271* (2018.05); *G06K 9/00248* (2013.01); *G06K 9/00288* (2013.01); *G06K 9/2018* (2013.01); *G06K 9/6202* (2013.01); *G06T 7/521* (2017.01)

(58) Field of Classification Search
CPC combination set(s) only.
See application file for complete search history.

(56) References Cited

U.S. PATENT DOCUMENTS

| | | | | |
|---|---|---|---|---|
| 5,973,788 A | * | 10/1999 | Pettersen | G01C 15/00 356/614 |
| 2006/0197867 A1 | * | 9/2006 | Johnson | F16M 11/18 348/373 |
| 2010/0061642 A1 | * | 3/2010 | Kondo | G06T 5/003 382/224 |
| 2010/0172411 A1 | * | 7/2010 | Efremov | H04N 19/59 375/240.12 |
| 2013/0321823 A1 | * | 12/2013 | Takahashi | G01B 11/24 356/601 |
| 2014/0205009 A1 | * | 7/2014 | Rose | H04N 19/547 375/240.12 |

FOREIGN PATENT DOCUMENTS

CN   103557796   *   2/2014   ............. G01B 11/00

* cited by examiner

*Primary Examiner* — Zhiyu Lu
(74) *Attorney, Agent, or Firm* — ScienBiziP, P.C.

(57) ABSTRACT

A 3D camera device able to sense reflected visible light and reflected laser light to create a 3D image of a face or other object includes a laser source, one or more image sensors, and a data processing module. The data processing module obtains two-dimensional coordinates of the target object by processing two-dimensional image signal and obtains depth coordinates of the target object by processing depth image signal of the target object provided by the laser. A method applied to such device is also disclosed.

15 Claims, 13 Drawing Sheets

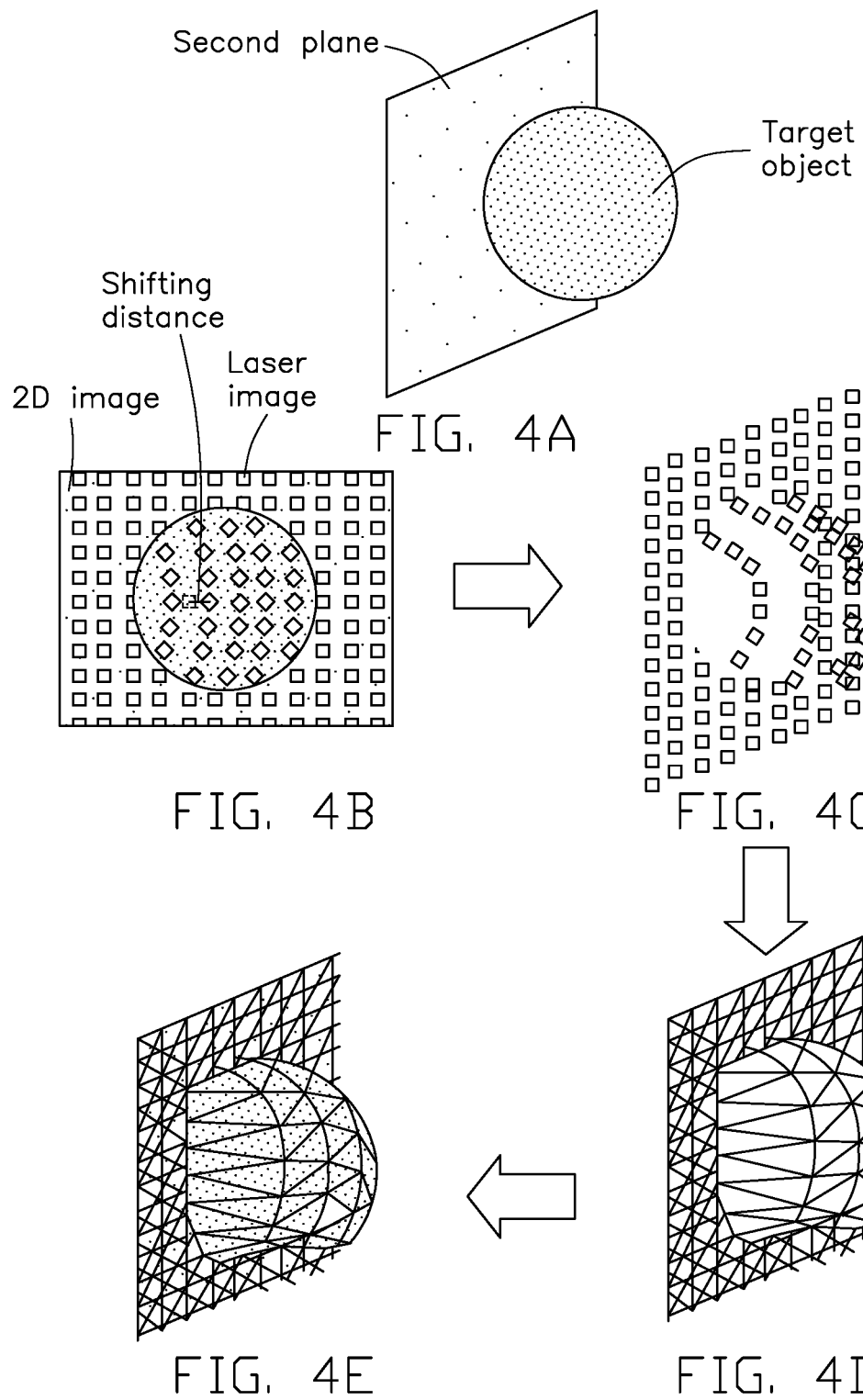

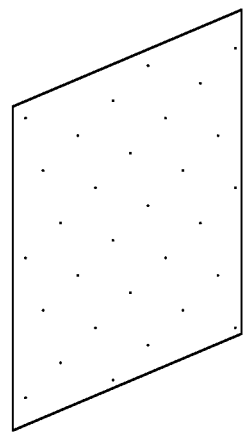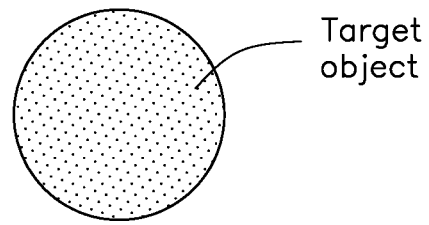
FIG. 5A
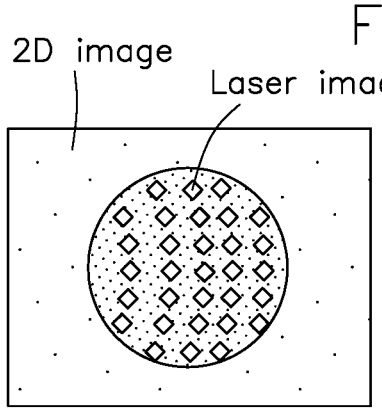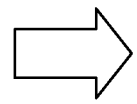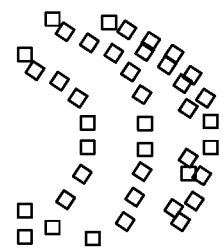
FIG. 5B
FIG. 5C
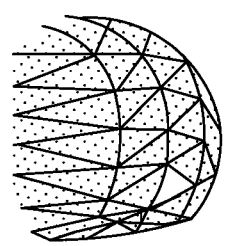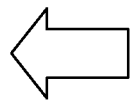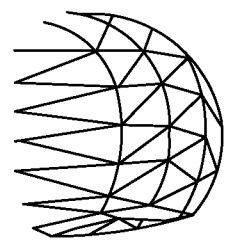
FIG. 5E
FIG. 5D

US 10,841,565 B2

3D CAMERA DEVICE, 3D IMAGING METHOD, AND HUMAN FACE RECOGNITION METHOD

FIELD

The subject matter herein generally relates to a three-dimensional (3D) camera device, a 3D imaging method, and a human face recognition method.

BACKGROUND

The conventional 3D camera device generally includes two image sensors to take images of a target object from different viewing angles. The images are used to calculate 3D coordinate information of the target object. The at least two image sensors result in the 3D camera device being complicated, large, and expensive. In addition, face recognition method using conventional 3D camera device generally includes determining whether acquired 3D coordinates of a face is corresponding to stored 3D coordinates of that face. However, acquiring 3D coordinates of a face may take a long time.

BRIEF DESCRIPTION OF THE DRAWINGS

Implementations of the present technology will now be described, by way of example only, with reference to the attached figures.

FIG. 4A through FIG. 4E and FIG. 5A through FIG. 5E are views showing working principles of the 3D camera device of FIG. 1.

DETAILED DESCRIPTION

Figure 1:
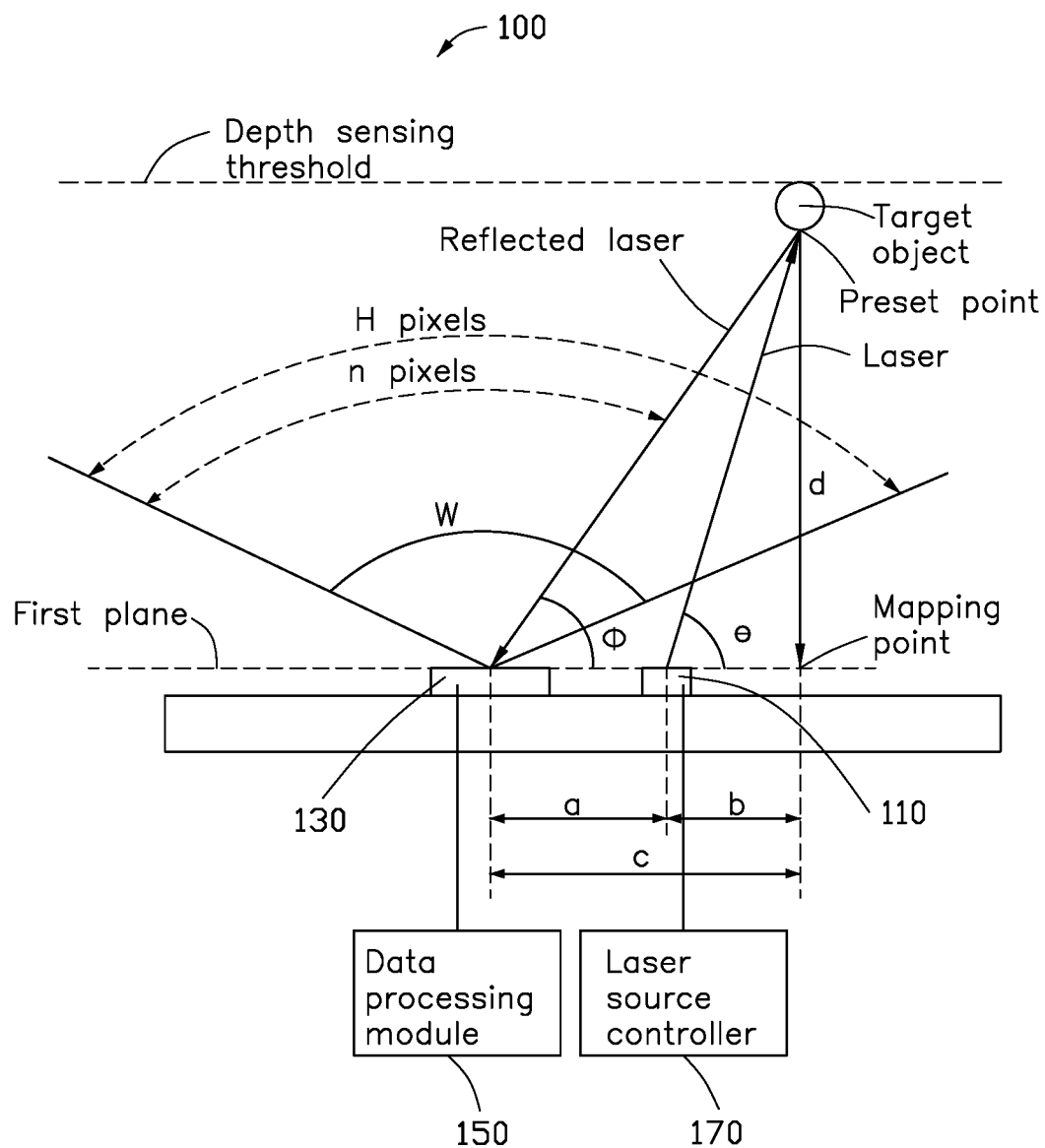
FIG. 1 is a schematic view of a three-dimensional (3D) camera device according to a first exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising" when utilized, means "including, but not necessarily limited to"; it specifically indicates open-ended inclusion or membership in the so-described combination, group, series, and the like.

Furthermore, the word "controller" and "module" as used hereinafter, refers to logic embodied in hardware or firmware, or to a collection of software instructions, written in a programming language, such as, for example, Java, C, or assembly. One or more software instructions in the controllers or modules may be embedded in firmware. It will be appreciated that controllers or modules may comprise connected logic units, such as gates and flip-flops, and may comprise programmable units, such as programmable gate arrays or processors. The controllers or modules described herein may be implemented as either software and/or hardware controllers and may be stored in any type of non-transitory computer-readable storage medium or other computer storage device.

Figure 2:
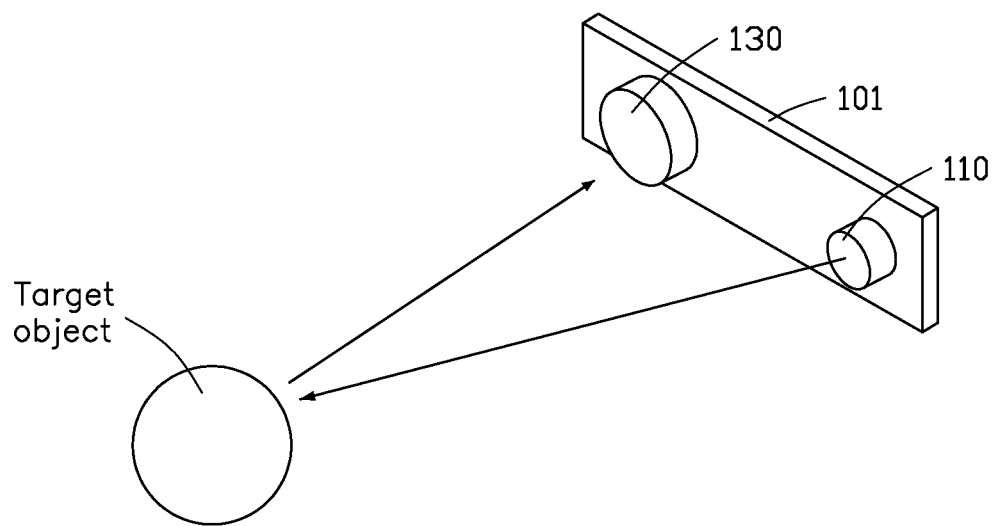
FIG. 2 is a schematic view of an image sensor and a laser source of the 3D camera device of FIG. 1.

FIG. 1 illustrates a 3D camera device 100 according to a first exemplary embodiment. The 3D camera device 100 includes a laser source 110, an image sensor 130, a data processing module 150, and a laser source controller 170. FIG. 2 shows the image sensor 130 and the laser source 110 of the 3D camera device of FIG. 1. The laser source controller 170 is configured to control the laser source 110. The image sensor 130 is configured for sensing visible light to generate a two-dimensional image signal of a target object and for sensing laser reflected by the target object to generate a depth image signal of the target object. The data processing module 150 is configured to obtain the 3D coordinate information of the target object by processing the two-dimensional coordinates and the depth coordinates of the target object.

The 3D camera device 100 may be a camera, a cell phone, a tablet computer, a notebook computer, a desktop computer, etc. The laser source 110 may be disposed adjacent to the image sensor 130. Specifically, the laser source 110 and the image sensor 130 may be disposed on a same substrate 101 (such as a same circuit board), as shown in FIG. 2. The laser source controller 170 is electrically coupled to the laser source 110. The light source controller 170 and the data processing module 150 may be disposed on the substrate 101 or disposed on a main circuit board (not shown) of the 3D camera device 100.

The laser source 110 emits laser light having a wavelength range that is different from wavelength range of visible light. In an exemplary embodiment, the wavelength of the laser may be greater than the wavelength of the visible light (about 400 to about 700 nm). For example, the laser source 110 may emit red laser having a dominant wavelength of about 950 nm. The laser source 110 is electrically coupled to the laser source controller 170 and is capable of emitting laser under the control of the laser source controller 170.

The image sensor 130 may sense visible light and reflected laser-light to generate a two-dimensional image signal and a depth image signal of the target object. The image sensor 130 is electrically coupled to the data processing module 150. It can be understood that the image sensor 130 may use lenses (not shown).

When the 3D camera 100 is working, the image sensor 130 may sense the visible light and the laser-light simultaneously to generate a composite image signal including the two-dimensional image signal and the depth image signal. The composite image signal is transmitted to the data processing module 150. The data processing module 150 may separate the two-dimensional image signal from the depth image signal, and calculate the two-dimensional coordinates of the target object according to the two-dimensional image signal. The depth coordinates of the target object according to the depth image signal may also be calculated. Thus, the 3D coordinate signals of the target object can be obtained.

Figure 3:
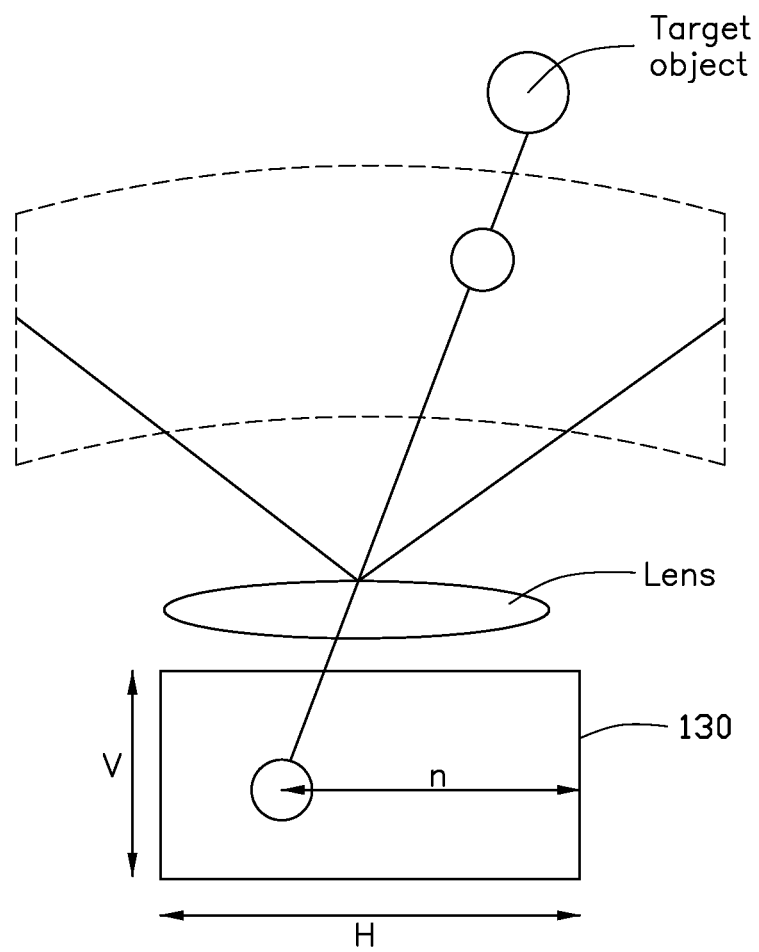
FIG. 3 is a view showing working principle of the image sensor of the 3D camera device of FIG. 1.

As shown in FIG. 2, the laser source 110 and the image sensor 130 are located on a same surface of the substrate 101. Specifically, as shown in FIG. 1, surface of the laser source 110 for emitting laser and surface of the image sensor 130 for sensing visible light and laser are on same plane, the first plane. The resolution of the two-dimensional image signal is H×V, where H is resolution of the horizontal direction, and V is resolution of the vertical direction. The viewing angle of the image sensor 130 is W, the angle between the laser emitted by the laser source 110 toward any preset point of the target object and the first plane is θ, and the angle between the first plane and a connecting line of the image sensor 130 and the preset point is φ. Formula φ=π/2−W(n−2H)/H is applied. As shown in FIG. 3, n is a horizontal resolution in a range between a position of the reflected laser in the two-dimensional image and edge of the two-dimensional image adjacent to the preset point along the horizontal direction.

It can be understood that the resolution H×V is known for a three-dimensional camera 100, being equal to the number of pixels of the pixel array in the image sensor 130. The view angle W of the image sensor 130 is also known, being related to the structure of the lens of the image sensor 130. The target object is within the view angle W of the image sensor 130, and direction of the laser emitted by the laser source 110 is also known. Therefore, an angle θ between each laser-light emitted by the laser source 110 and the first plane is known. Since the image sensor 130 can sense visible light and the reflected laser-light, position of the reflected laser in the two-dimensional image is also known, thus the horizontal resolution n is also known. Further, the data processing module 150 can calculate the angle φ according to the formula φ=π/2−W(n−2H)/H.

In additional, as shown in FIG. 1, a distance between the image sensor 130 and the laser source 110 is assumed to be a. The first plane includes a mapping point of the preset point, a distance between the preset point and the mapping point is equal to a vertical distance d between the preset point and the first plane, and a distance between the mapping point and the laser source 110 is b. Distance between the mapping point and the image sensor 130 is c, wherein tan(θ)=d/b, tan(φ)=d/c, d=a×tan(φ)×tan(θ)/(tan(φ)−tan(θ)), and the data processing module 150 can calculate the angle φ and the distance d. The distance d will represent a depth coordinate of the target object.

As described above, the laser source 110 emits laser-light toward any preset point of the target object. The image sensor 130 senses the visible light to obtain the two-dimensional image signal of the target object and senses the laser-light reflected by the preset point to obtain the depth image signal of the preset point. The data processing module 150 then calculates the three-dimensional coordinate information of the preset point of the target object according to the two-dimensional image signal and the depth image signal output by the image sensor 130. The laser source 110 may emit laser-light toward each preset point of the target object, the image sensor 130 senses the visible light to obtain a two-dimensional image signal of the target object, and can sense the laser-light reflected by each of the preset point points to obtain the depth image signal of each preset point. The data processing module 150 calculates the three-dimensional coordinate information of each preset point of the target object according to the two-dimensional image signal and the depth image signal output by the image sensor 130, so as to obtain the 3D coordinate information of the target object.

FIG. 4A shows a target object, wherein the target object may include a second plane and an object (such as a sphere) may be disposed on a side of the second plane closer to the 3D camera device. It can be understood that the laser source 110 emits laser-light in a range within the viewing angle W of the image sensor 130, and the range within the viewing angle W of the image sensor 130 is divided into H×V pixel regions arranged in a matrix. In this exemplary embodiment, a cross-section of the laser beam emitted by the laser source 110 has a thin rod shape (such as a small circular or square cross section), and the laser source controller 170 may control the laser source 110 to emit a plurality of laser beams one by one toward the H×V pixel regions. Each pixel region may correspond to one of the preset points of the target object. That is, the laser source controller 170 may control the laser source 110 to emit a number of laser beams one by one toward a number of preset points of the target object.

There is a predetermined time interval t between emission times of the two laser beams toward any two adjacent preset points of the target object. The image sensor 130 has a depth sensing threshold due to capability limitation of the image sensor 130. That is, the depth image signal of the object beyond the depth sensing threshold within the view angle W of the image sensor 130 cannot be acquired or is set as an invalid signal. To avoid the two reflected laser interfering with each other, the predetermined time interval t is preferably greater than a time required for the laser to transmit twice the maximum distance between the laser source 110 and the depth sensing threshold. It can be understood that, in the present embodiment, the second plane shown in FIG. 4A is within the depth sensing threshold, for example, it may be located just at the depth sensing threshold.

Further, the laser source controller 170 controls the laser source 110 to emit the laser beams one by one toward the plurality of preset points corresponding to the H×V pixel regions, at the predetermined time interval t. It can be understood that, the H×V pixel regions are arranged in a matrix, the laser source 110 may emit a first laser beam toward a pixel region at a corner of the matrix, and the image sensor 130 senses the reflected first laser beam to obtain a laser image. The laser source 110 then emits a second laser beam toward neighboring pixel region (such as an adjacent pixel region along the horizontal direction) and senses the reflected second laser beam to obtain a second laser image. Further, the laser source 110 may emit laser beams one by one toward a row of pixel regions along the horizontal direction, so that the image sensor 130 senses images of reflected laser corresponding to the row of pixel regions, and then the laser source 110 may emit laser beams one by one toward the pixel regions in a next row along the horizontal direction so that the image sensor 130 senses images of reflected laser corresponding to the pixel regions in the next row. This continues until the laser source 110 has emitted laser beams toward all of the pixel regions and the image sensor 130 senses the images of reflected laser beams corresponding to all of pixel regions, to obtain the depth image signal. Further, the time required for the laser source 110 to emit laser beams one by one toward the H×V pixel regions and the image sensor 130 to receive the corresponding reflected laser beams may be defined as a sensing period T. It can be understood that the sensing period T=H×V×t. The image sensor 130 may also sense visible light during the sensing period T to generate a two-dimensional image signal of the target object.

The laser source 110 emits laser beams one by one toward the plurality of preset points corresponding to the H×V pixel regions, and each angle θ, between the first plane and the laser emitted by the laser source 110 toward different preset points (or different pixel regions), is different. In one embodiment, for a row of pixel regions along a horizontal direction, the laser source controller 170 may control the angles θ to gradually increase with the order of emitting.

Specifically, the angles θ between the laser and the first plane include a minimum value and a maximum value, and the minimum value is an angle between the first plane and the laser at an initial position. The laser source controller 170 further determines whether the current angle θ reaches the maximum value. When the current angle θ reaches the maximum value, the laser source controller 170 controls the laser beam to return to the initial position such that the angle θ between the first plane and the laser beam reaches the minimum value, then the laser following is emitted toward a next row of pixel regions. When the current angle θ does not reach the maximum value, the laser source controller 170 controls the laser source 110 to emit laser, and the angle θ between the first plane and the laser beam following emitted by the laser source 110 is increased with respect to the current angle θ.

A composite image including the two-dimensional image signal and the depth image signal of the target object in FIG. 4A is shown in FIG. 4B. The composite image includes the two-dimensional images corresponding to the two-dimensional image signal and the depth images containing a plurality of laser images and corresponding to the depth image signal, wherein each laser image is substantially the same as a cross-sectional shape of the laser beam emitted by the laser source 110 (such as a dot shape).

Due to the target object, a position of the image of laser beam reflected by the object has a little shift (such as a left shift shown in FIG. 4B) compared with a position of the image of laser reflected by the second plane. Specifically, a shift distance is related to a distance between the object and the 3D camera device 100. For example, the greater the distance between the object and the 3D camera device 100 is, the greater is the shifting distance, and the less the distance between the object and the 3D camera device 100, the less is the shifting distance. As shown in FIG. 4C, the data processing module 150 calculates the depth of each preset point of the target object according to the shifting distance, that is, obtains depth coordinates of the preset points of the target object.

Further, the 3D coordinates of the target object can be obtained by the data processing module 150 according to the two-dimensional coordinates and the depth coordinates of each preset point of the target object.

As the second plane is a plane facing the image sensor 130, the two-dimensional coordinates of the preset points can be obtained according to an image formed by laser reflected by each preset point on the second plane. The 3D coordinates of each preset point of the second plane can be obtained according to a distance from the second plane to the image sensor 130. The 3D coordinates of the target object in FIG. 4A are shown in FIG. 4C. The data processing module 150 may connect adjacent image points formed by laser beams reflected by the preset points to obtain a 3D contour image as shown in FIG. 4D. The 3D contour image shown in FIG. 4 (*d*) of the data processing module 150 may be filled with the color information (such as the three primary colors of red, green, and blue) in the two-dimensional image signal so as to obtain 3D image information of the target object, shown in FIG. 4E.

In another example of the target object as shown in FIG. 5A, the target object does not include a second plane, but includes at least one object within the viewing angle range W of the image sensor 130. Such object is not below the threshold for depth sensing. For the target object shown in FIG. 5A, a composite image including the two-dimensional image and the depth image signal sensed by the 3D image device 100 is shown in FIG. 5B. Further, the data processing module 150 calculates the depth information of each preset point of the target object according to the shift distance to obtain depth coordinates of the preset points of the target object, and the 3D coordinates of the target object shown in FIG. 5A are shown in FIG. 5C. The data processing module 150 may connect adjacent image points formed by laser reflected by the preset points to obtain a 3D contour image as shown in FIG. 5D. The 3D contour image shown in FIG. 5D of the data processing module 150 may be filled with the color information (such as the three primary colors of red, green and blue) in the two-dimensional image signal so as to obtain 3D image information of the target object, shown in FIG. 5E.

Compared with the prior art, for the 3D camera device 100 and the image capturing method, the image sensor 130, the laser source 110, and the data processing module 150 can be used to obtain the 3D coordinates of the target object. Compared with conventional 3D camera device having at least two image sensors, the 3D camera device 100 of the present disclosure has a simple structure and a small volume.

However, in the above described first embodiment, since the laser source controller 170 controls the laser source 110 to emit laser beams one by one toward H×V pixel regions at the predetermined time interval T, when the resolution H×V is great, the number of the laser beams is great, and the sensing period T for sensing the depth image signal is long, which may limit utility. In order to reduce the sensing period T, in a modified embodiment, the number of lasers may be less than the resolution H×V, for example, the number of laser beams may be 1/m of the resolution H×V, each laser beam being emitted toward m adjacent pixel regions.

Further, in order to reduce the sensing period T, the laser beam emitted by the laser source 110 may have a linear cross section, and each linear laser beam may be emitted toward at least one column of the pixel regions along the vertical direction or at least one row of pixel regions along the horizontal direction. In this case, the at least one column of pixel regions or the at least one row of pixel regions is defined as an emitting area. The image sensor 130 senses the image of the linear laser beam reflected by the target object to obtain a depth image signal. FIG. 6 illustrates working principle of the 3D camera device according to the second embodiment of the present disclosure. FIG. 6 mainly illustrates that each linear laser beam is emitted toward at least one column of pixel regions along the vertical direction. The 3D camera device of the second embodiment is basically the same as the 3D camera device of the first embodiment. The difference between the 3D camera device of the second exemplary embodiment and the 3D camera device of the first exemplary embodiment is that the laser beam emitted by the laser source is different.

In the second exemplary embodiment, the laser source emits the linear laser beam toward a plurality of emitting areas corresponding to the H×V pixel regions. There is a predetermined time interval t between emission times of the laser beam toward any two adjacent preset points of the target object is t. The sensing period T of the depth image signal is H×t, and the sensing period T of the depth image signal is greatly reduced compared to such period in the first exemplary embodiment. The 3D camera device of the second exemplary embodiment has a less time for sensing the depth image signal.

Figure 6A:
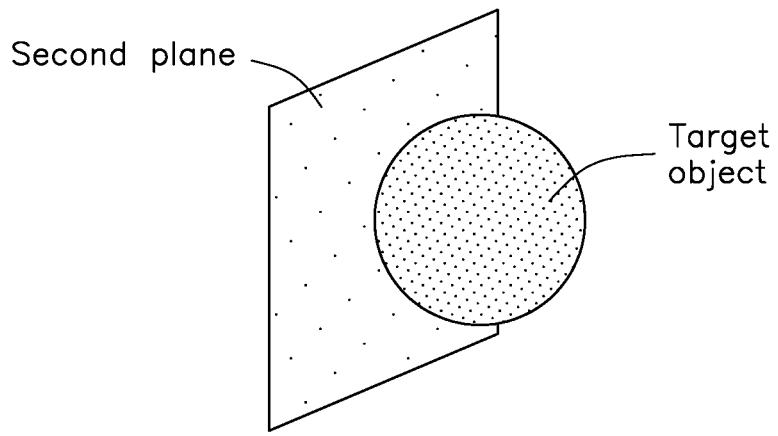
FIG. 6A through FIG. 6E and FIG. 7A through FIG. 7E are views showing working principles of a 3D camera device according to a second exemplary embodiment.
Figure 6B:
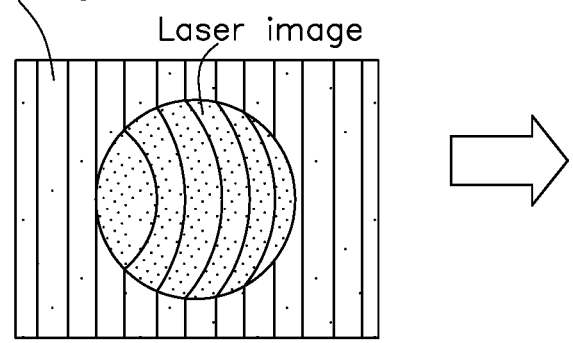
Figure 6C:
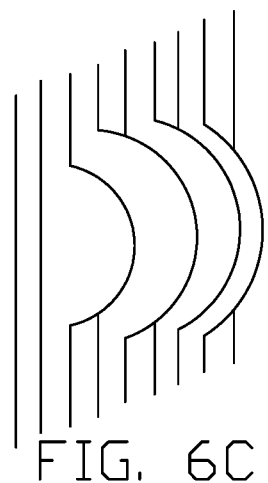
Figure 6E:
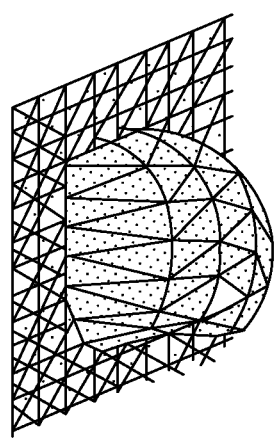

The target object in FIG. 6A is the same as the target object in FIG. 5A. The composite image including the two-dimensional image signal and the depth image signal of the target object sensed by the image sensor is shown in FIG. 6B. It can be understood that due to the object, a position of the image of laser reflected by the object has a little shift (such as a left shift) compared with a position of the image of laser reflected by the second plane. Specifically, shift distance is related to a distance between the object and the 3D camera device 100. For example, the greater the distance between the object and the 3D camera device 100, the greater the shifting distance will be; the less the distance between the object and the 3D camera device 100, the less the shifting distance will be. As shown in FIG. 6C, the data processing module 150 calculates the depth of each preset point of the target object according to the shift distance, that is, obtains depth coordinates of the linear regions of the target object.

Further, the data processing module may determine the two-dimensional coordinates of the linear laser according to the position of the image formed by linear laser beam reflected by the second plane, and combine the depth coordinates of the linear regions of the target object. Thereby, 3D coordinates of the object can be obtained.

Figure 6D:
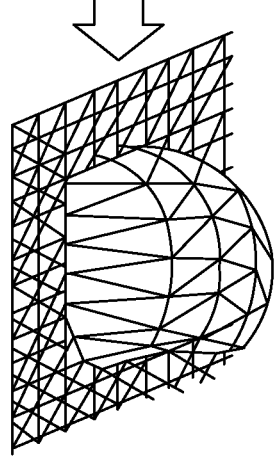

It can be understood that, as the second plane is a plane facing the image sensor, two-dimensional coordinates of the linear regions can be obtained according to image formed by laser reflected by the linear regions on the second plane, and the 3D coordinates of each linear region in the second plane can be obtained according to a distance from the second plane to the image sensor. The 3D coordinates of the target object shown in FIG. 6A are shown in FIG. 6C. The data processing module may connect pixel regions (e. g, a center point of the pixel region) in the adjacent linear images formed by laser reflected by the linear regions to obtain a 3D contour image as shown in FIG. 6D. The 3D contour image shown in FIG. 6D of the data processing module infills the color information (such as the three primary colors of red, green, and blue) in the two-dimensional image signal so as to obtain 3D image information of the target object shown in FIG. 6E.

Figure 7A:
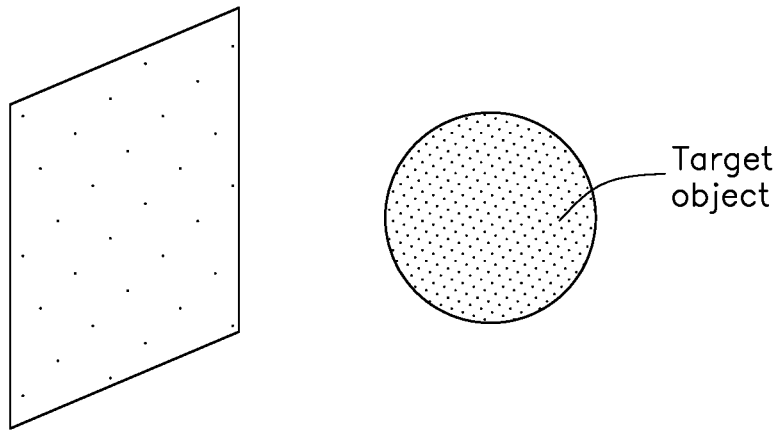
Figure 7B:
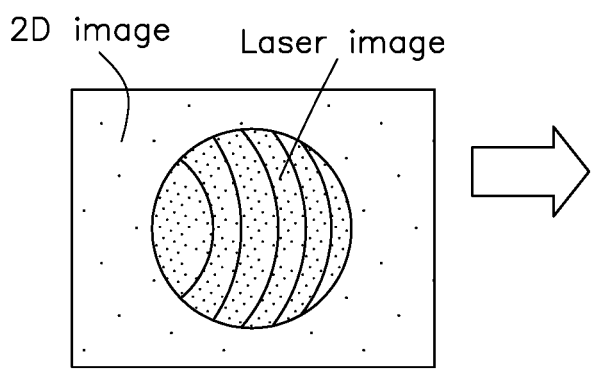
Figure 7C:
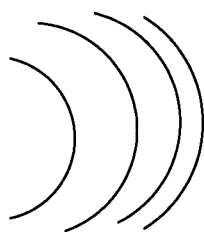
Figure 7E:
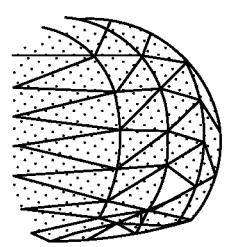
Figure 7D:
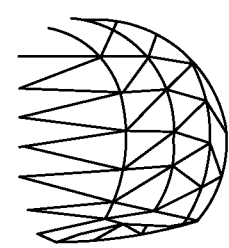

In another example of the target object, as shown in FIG. 7A, the target object does not include a second plane, but includes at least one object within the viewing angle range W of the image sensor 130, which is not beyond the threshold for depth sensing. For the target object shown in FIG. 7A, a composite image including the two-dimensional image and the depth image signal sensed by the 3D image device 100 is shown in FIG. 7B. Further, the data processing module 150 calculates the depth information of each linear region of the target object according to the shift distance to obtain depth coordinates of the linear regions of the target object, and the 3D coordinates of the target object shown in FIG. 7A are shown in FIG. 7C. The data processing module 150 may connect pixel regions (e. g, a center point of the pixel region) in the adjacent linear images formed by laser reflected by the linear regions to obtain a 3D contour image as shown in FIG. 7D. The 3D contour image shown in FIG. 7D of the data processing module 150 may be filled with the color information (such as the three primary colors of red, green, and blue) in the two-dimensional image signal so as to obtain 3D image information of the target object shown in FIG. 7E.

Figure 8:
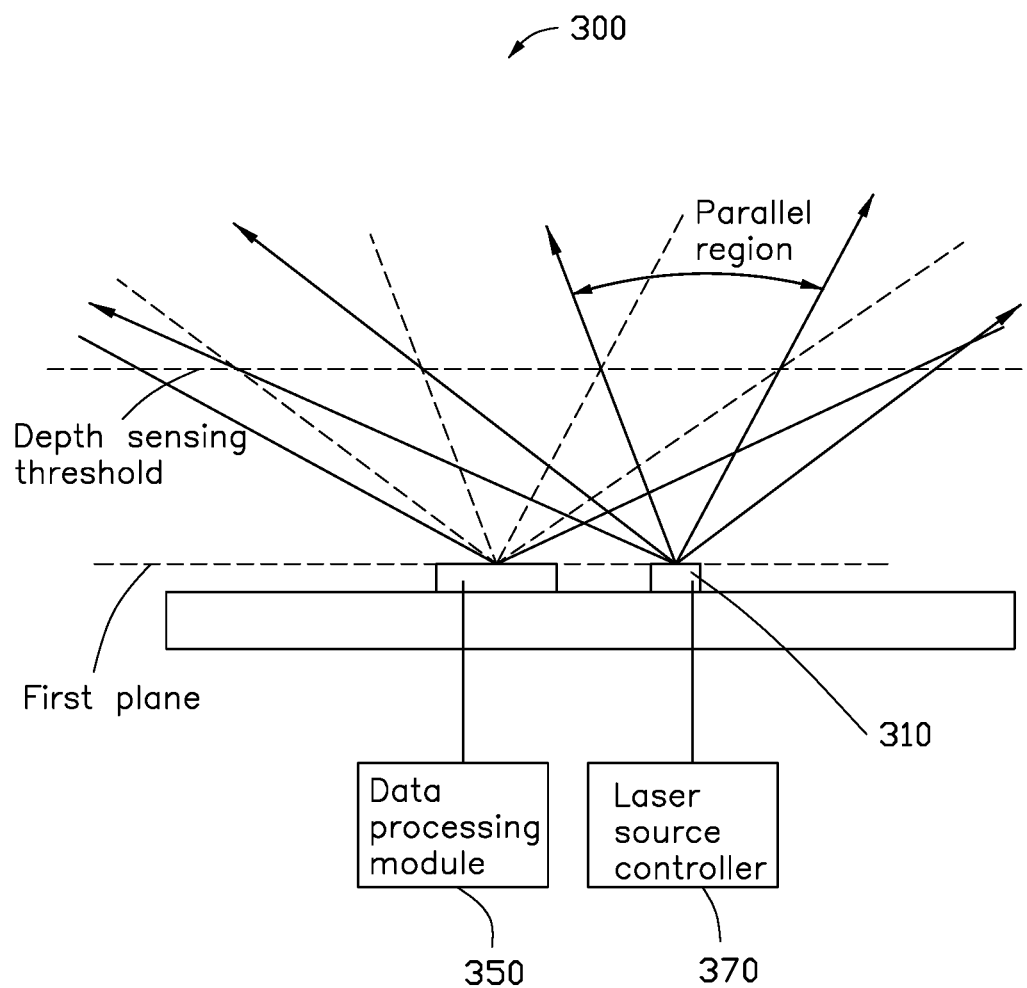
FIG. 8 is a view showing working principle of a 3D camera device according to a third exemplary embodiment.

In order to reduce the sensing period T, the laser source controller 170 can control the laser source 110 to emit laser having a linear cross section toward all of the emitting areas corresponding to the H×V pixel regions. The emitting area is defined as at least one column of the pixel regions along the vertical direction or at least one row of pixel regions along the horizontal direction. FIG. 8 illustrates working principle of the 3D camera device according to the third embodiment of the present disclosure. The 3D camera device 300 of the third embodiment is basically the same as the 3D camera device of the second embodiment. The difference between the 3D camera device 300 of the third exemplary embodiment and the 3D camera device of the second exemplary embodiment is that the laser source 310 in the third exemplary embodiment emits a plurality of linear laser beams toward all of the emitting areas simultaneously, and the laser source 310 in the second exemplary embodiment emits a number of linear laser beams one by one toward the emitting areas.

The H×V pixel regions are further divided into a plurality of parallel regions, and each parallel region includes a plurality of adjacent emitting areas. The laser source 310 simultaneously emits a plurality of linear laser beams; and each of a plurality of linear lasers corresponds to one of the plurality of parallel regions. Each parallel region includes same number of emitting areas.

For each parallel region, the laser source 310 further emits a plurality of linear laser beams one by one toward a plurality of emitting regions of each parallel region, and the angle θ between the first plane and the linear laser beams gradually increases or decreases with the order of emitting.

Figure 9:
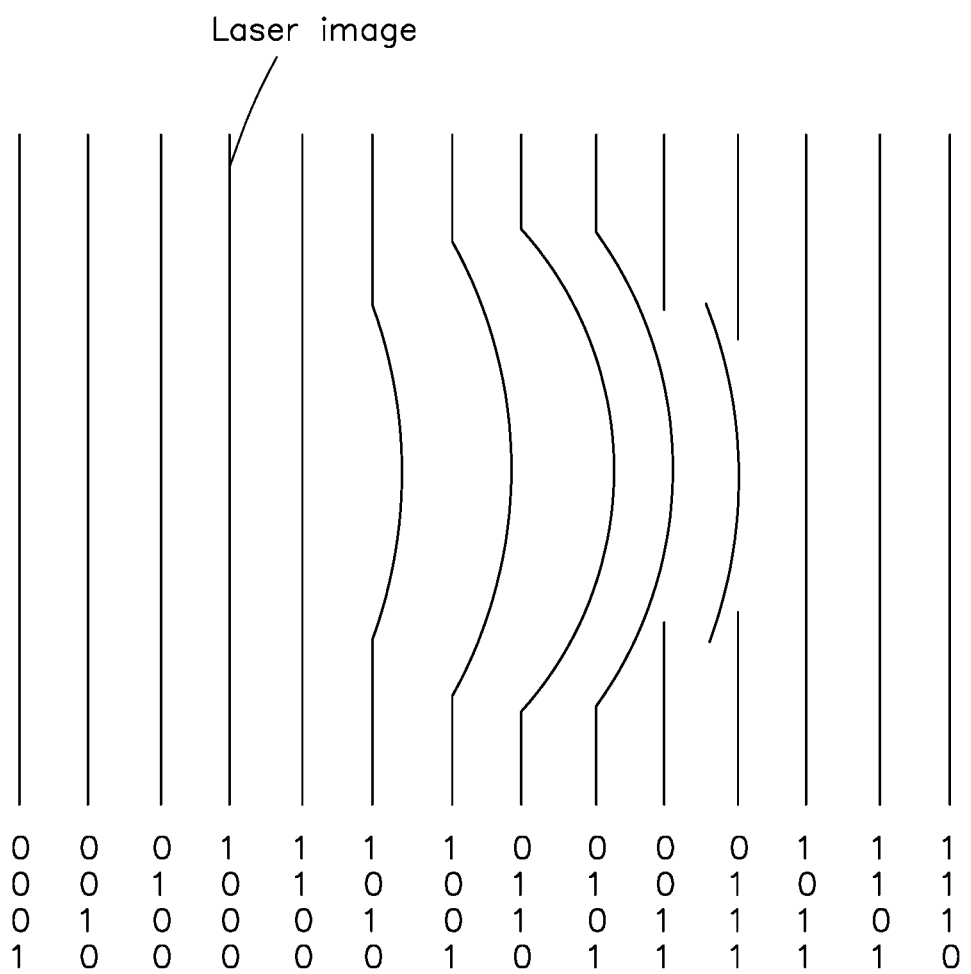
FIG. 9 is a view showing working principle of the 3D camera device according to a fourth exemplary embodiment.

FIG. 9 illustrates working principle of the 3D camera device according to the fourth embodiment of the present disclosure. The 3D camera device of the fourth embodiment is basically the same as the 3D camera device of the second embodiment. The differences between the 3D camera device of the fourth exemplary embodiment and the 3D camera device of the second exemplary embodiment are that the laser source 110 in the fourth exemplary embodiment simultaneously emits a plurality of linear laser beams toward all of the emitting areas, while the laser source 110 in the second exemplary embodiment emits a plurality of linear laser beams one by one toward the emitting areas. The methods and principles of acquiring the depth coordinates of the target object by the data processing module are also different.

The plurality of linear laser beams simultaneously emitted by the laser source toward the plurality of emitting areas of the H×V pixel regions has a first intensity and a second intensity different from the first intensity. The laser source controller is configured to control the intensities of the plurality of linear laser beams emitted by the laser source according to intensity control signal, and each linear laser has the first intensity or the second intensity; the first intensity is not zero, and the second intensity may be zero.

In the sensing period T, the laser source controller controls the number of times that the laser source simultaneously emits the plurality of linear laser beams toward the plurality of emitting regions of the H×V pixel regions, that number being k times. The image sensor generates a depth image signal according to the laser beams of k times reflected by the target object. As shown in FIG. 9, the depth image includes a plurality of laser images each corresponding to one linear laser. The intensity control signal corresponding to each linear laser is a k-bit binary code, digit 1 of the k-bit binary code corresponds to the first intensity, and digit 0 of the k-bits binary code corresponds to the second intensity. The k-bit binary codes of the light intensity control signals corresponding to the plurality of linear laser beams are different from each other.

In this exemplary embodiment, S number of the emitting areas equals horizontal resolution H, and the relationship between the number S and the number of times k satisfies a formula: $S=2^k-2$, and the k-bit binary code does not include a binary code containing all digit 0 or all digit 1. In the present exemplary embodiment, a refresh rate F of the depth image signal is 60 Hz.

FIG. 9 illustrates an example taking k as 4 and the horizontal resolution H as 14. In other exemplary embodiments, the k may not be 4. For example, in one exemplary embodiment, if the horizontal resolution H in the resolution H×V is 1920, and the number of emitting areas S is 1920, the number of times k is 11, and the refresh rate F of the depth image signal is 5.5 Hz.

Figure 10:
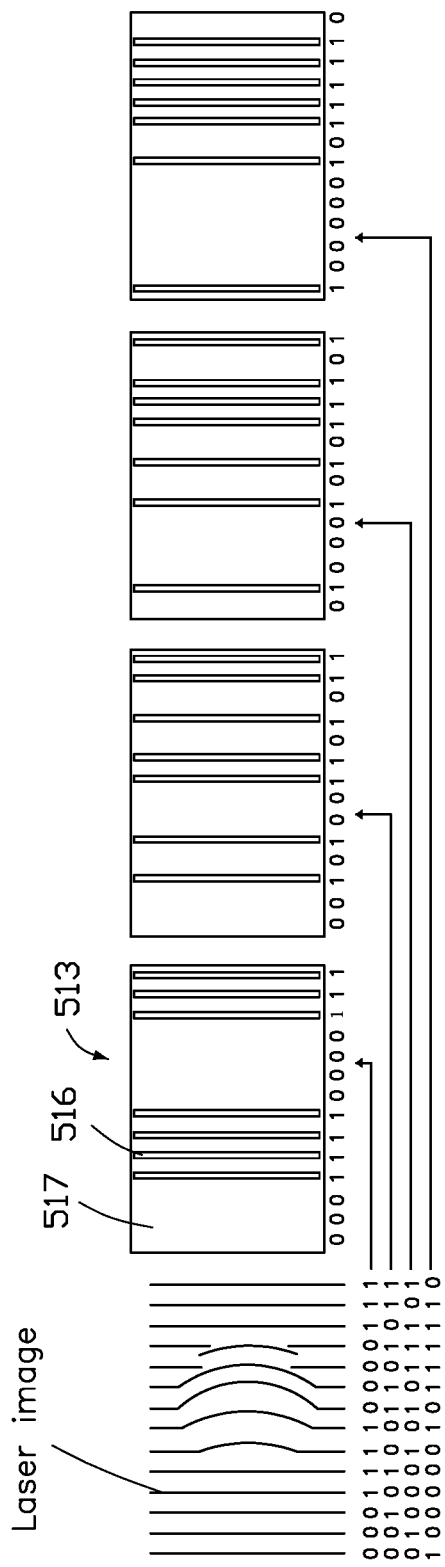
FIG. 10 is a view showing working principle of the 3D camera device according to a fifth exemplary embodiment.
Figure 11:
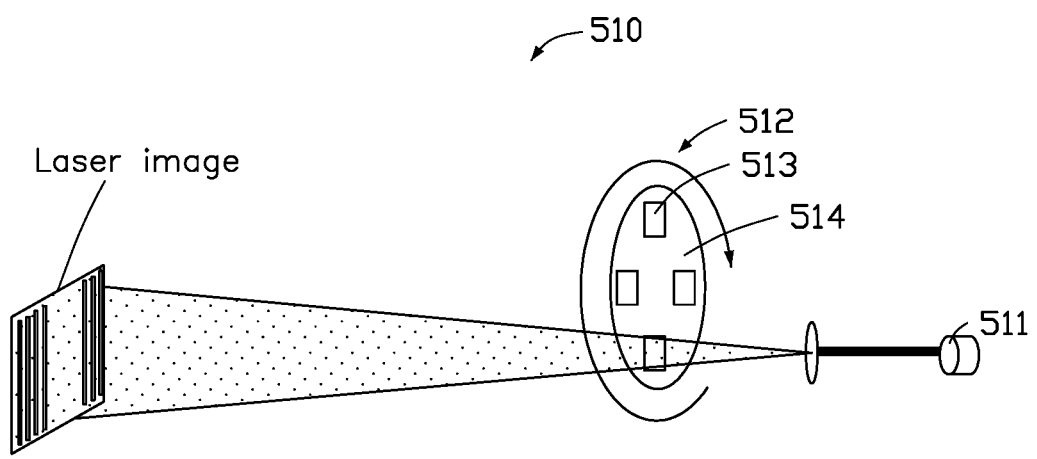
FIG. 11 is a schematic view of a laser source of the 3D camera device of FIG. 10.

FIG. 10 illustrates working principle of the 3D camera device according to the fifth embodiment of the present disclosure. FIG. 11 is an isometric view of the laser source 510 of FIG. 10. The working principle of the 3D camera device of the fifth embodiment is basically the same as the working principle of the 3D camera device of the fourth embodiment. The two 3D camera devices of the fifth and fourth embodiment have two different laser sources 510, and methods and principles for calculating the depth coordinates of the target object by the data processing module are basically different.

In the fifth exemplary embodiment, the plurality of linear laser beams simultaneously emitted by the laser source 510 toward the plurality of emitting areas of the H×V pixel regions has a first intensity and a second intensity different from the first intensity. The first intensity may not be digit 0 and is characterized by a binary code 1; the second intensity may be digit 0 in binary code. The laser source 510 includes a laser-emitting element 511 and a laser control element 512 located in optical paths of the laser emitted by the laser-emitting element 511. The laser control element 512 includes k grating masks 513, each grating mask 513 includes a first region 516 allowing linear laser beam having the first intensity to pass through and a second region 517 allowing linear laser having the second intensity to pass through. The first region 516 and the second region 517 correspond to the plurality of emitting areas, the laser beams emitted to the emitting areas by the first region 516 have the first intensity, and the laser beams emitted to the emitting area by the second region 517 have the second intensity. In the present exemplary embodiment, the first region 516 is a laser-transmitting region, and the second region 517 is a laser-impermeable region. The plurality of linear laser beams are simultaneously emitted toward a plurality of emitting areas of the H×V pixel regions by passing through each grating mask 513, and the patterns of the grating masks 513 are different from each other, as shown in FIG. 10. The depth image corresponding to the depth image signal includes the laser images each corresponding to one laser in the first region 516. The laser-emitting element 511 is powered on during the sensing period T, and the laser-emitting element 511 emits the plurality of linear laser beams toward the plurality of emitting regions one by one through the k grating masks 513.

FIG. 10 illustrates an example by taking k as 4 and the horizontal resolution H as 14. In other exemplary embodiments, the k may not be 4. For example, in one exemplary embodiment, if the horizontal resolution H in the resolution H×V is 1920, the number of emitting areas S is 1920, thus the number of times k is 11.

The k grating masks 513 are located on a substrate 514 along a circumferential direction of the substrate 514. The substrate 514 is rotated along center of the circumference such that the k grating masks 513 are sequentially located in the optical path of the laser emitted by the light-emitting element 511, such that the plurality of linear laser beams are sequentially emitted toward the plurality of emitting areas.

Figure 12:
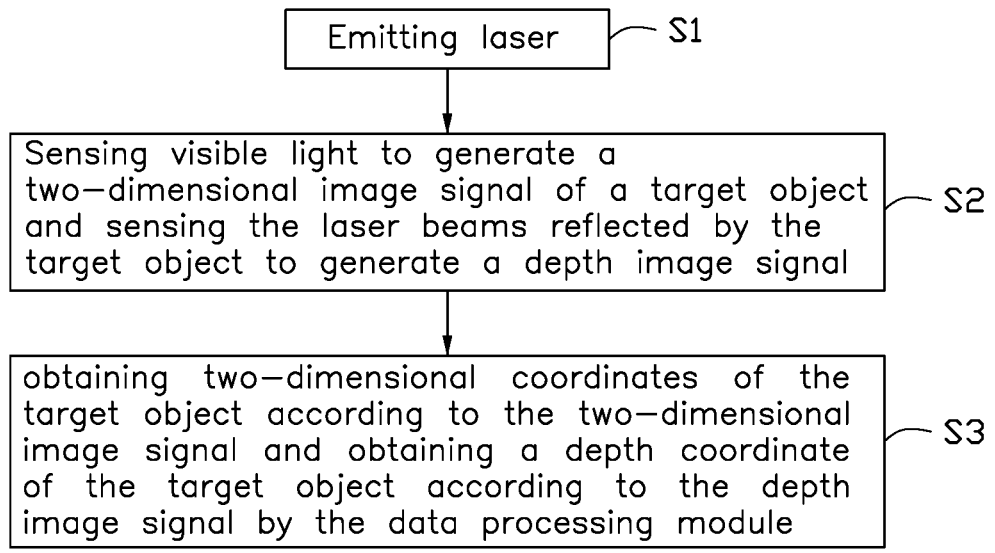
FIG. 12 is a flowchart of a 3D imaging method.

FIG. 12 is a flowchart of a 3D imaging method applied to one of the 3D camera devices of the first to fifth embodiments and the modifications thereof. The 3D imaging method according to an exemplary embodiment of the present disclosure includes the following steps.

Step S1: the laser source emits laser beams.

The laser source is controlled by the laser source controller. Since the laser sources and the laser source controllers have been described in detail in the first to the fifth embodiments and the modifications thereof, details are not described herein again.

Step S2: the image sensor senses visible light to generate a two-dimensional image signal of a target object and senses the laser beams reflected by the target object to generate a depth image signal.

Step S3: the data processing module obtain two-dimensional coordinates of the target object according to the two-dimensional image signal, and obtain a depth coordinate of the target object according to the depth image signal. Thus, the 3D coordinates of the target object can be obtained.

In step S3, the 3D coordinate information of the target object may be calculated and obtained by using the data processing module. The data processing module has been described in detail in the first to the fifth embodiments and the modified embodiments thereof, and details are not described herein again.

Figure 13:
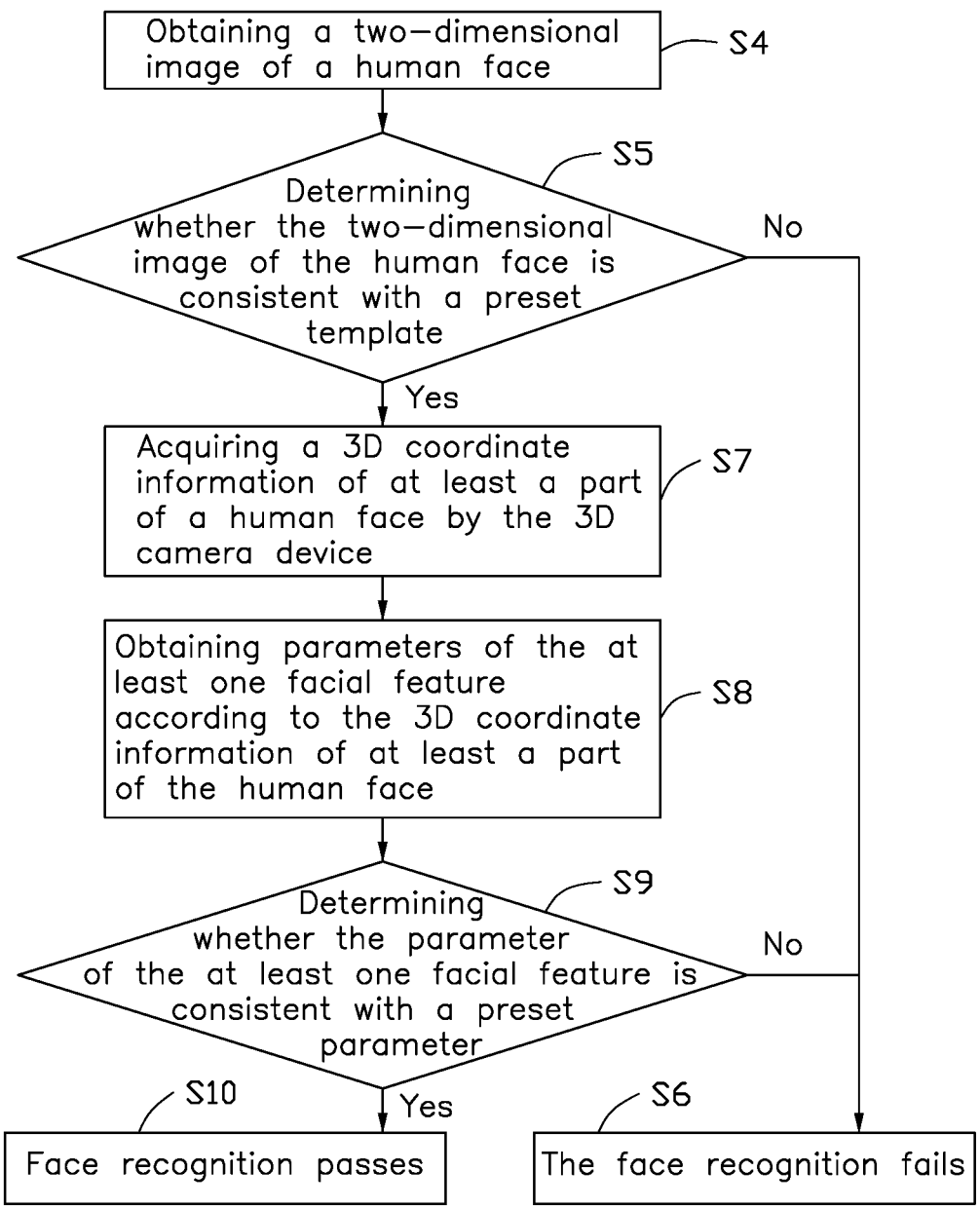
FIG. 13 is a flowchart of a human face recognition method.

FIG. 13 is a flowchart of a human face recognition method. The human face recognition method according to an exemplary embodiment of the present disclosure includes the following steps.

Step S4: a two-dimensional image of a human face is obtained.

Step S5, it is determined whether the two-dimensional image of the human face is consistent with a preset template. If yes, the procedure goes to step S7. Otherwise, the procedure goes to step S6, that is the face recognition fails.

Step S7: 3D coordinate information of at least a part of a human face is acquired by using a 3D camera device, wherein the at least part of the human face includes at least one facial feature. The 3D camera device may be a 3D camera device described in detail in the first to the fifth embodiments and the modifications thereof.

Step S8: Parameters of the at least one facial feature is obtained according to the 3D coordinate information of at least a part of the human face.

Step S9: it is determined whether the parameter of the at least one facial feature is consistent with a preset parameter.

If yes, the procedure goes to step S10, that is, face recognition successes; otherwise, the procedure goes to step S6, that is, face recognition fails.

The at least one facial feature may be eyes, cheekbones, or a nose. Parameters of the at least one facial feature may be a distance of two eyes, cheekbones height, or a nose height.

In the human face recognition method of the present disclosure, it is first determined whether the two-dimensional image of the face is consistent with the preset template, if no, the human face recognition fails. Compared with conventional human face recognition method for determining whether the 3D coordinate information of the human face is consistent with a stored 3D coordinate information, the human face recognition method of the present disclosure can reduce recognition time and improve the user experience. Further, for the human face recognition method of the present disclosure, only a preset template of a two-dimensional image of a human face and a preset parameter of the at least one facial feature need to be stored. Compared with conventional human face recognition method that stores the 3D coordinate information of a human face, the human face recognition method of the present disclosure can reduce data storage amount and increase data comparison rate, which can help to reduce hardware costs, improve hardware life, reduce face recognition time, and improve user experience.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A 3D camera device, comprising:
   a laser source configured to emit laser to a target object;
   an image sensor configured to sense visible light to generate a two-dimensional image signal of the target object and sense laser reflected by the target object to generate a depth image signal; and
   a data processing module electrically coupled to the image sensor, the data processing module configured to obtain two-dimensional coordinates of the target object by processing the two-dimensional image signal of the target object and obtain depth coordinates of the target object by processing the depth image signal of the target object, 3D coordinates of the target object obtained by the data processing module;
   wherein a surface of the laser source for emitting laser and a surface of the image sensor for sensing visible light and laser are on a same first plane, a resolution of the two-dimensional image signal is H×V, H is resolution of the horizontal direction, V is resolution of the vertical direction, the viewing angle of the image sensor is W, the angle between laser emitted by the laser source toward any preset point of the target object and the first plane is $\theta$, the angle between the connecting line of the image sensor and the preset point and the first plane is $\phi$, wherein $\phi=\pi/2-W(n-2H)/H$, n is a horizontal resolution in a range between a position of the reflected laser in the two-dimensional image and edge of the two-dimensional image adjacent to the preset point along the horizontal direction.

2. The 3D camera device of claim 1, wherein a wavelength of the laser is greater than a wavelength of the visible light.

3. The 3D camera device of claim 1, wherein the laser source is configured to emit red laser having a dominant wavelength of about 950 nm.

4. The 3D camera device of claim 1, wherein there is a shifting distance between position of the image of laser reflected by the object and a standard position, the data processing module calculates the coordinates of the target object according to the shifting distance.

5. The 3D camera device of claim 1, wherein a distance between the image sensor and the laser source is a, the first plane comprises a mapping point of the preset point, a distance between the preset point and the mapping point is equal to a vertical distance d between the preset point and the first plane, a distance between the mapping point and the laser source is b, a distance between the mapping point and the image sensor is c, wherein $\tan(\theta)=d/b$, $\tan(\theta)=d/c$, $d=a\times\tan(\phi)\times\tan(\theta)/(\tan(\phi)-\tan(\theta))$, and the data processing module calculates the angle $\phi$ by using formula $\phi=\pi/2-W(n-2H)/H$ and calculates the distance d by using formula $d=a\times\tan(\phi)\times\tan(\theta)/(\tan(\phi)-\tan(\theta))$, the distance d represents a depth coordinate of the target object.

6. The 3D camera device of claim 1, wherein the laser source is configured to emit laser in a range within the viewing angle W of the image sensor, and the range within the viewing angle W of the image sensor is divided into H×V pixel regions arranged in a matrix, the 3D camera device further comprises a laser source controller electrically coupled to the laser source, a cross-section of the laser emitted by the laser source has a point shape, and the laser source controller configured to control the laser source to emit a plurality of laser beams one by one toward the H×V pixel regions.

7. The 3D camera device of claim 6, wherein the angles $\theta$ between the laser beams and the first plane include a minimum value and a maximum value, and the minimum value is an angle between the first plane and the laser at an initial position; the laser source controller further determines whether the current angle $\theta$ between the first plane and the laser currently emitted by the laser source reaches the maximum value; when the current angle $\theta$ reaches the maximum value, the laser source controller controls the laser source to return to the initial position such that the angle $\theta$ between the first plane and the laser following emitted by the laser source reaches the minimum value and the laser following emitted is toward a next row of pixel regions; when the current angle $\theta$ does not reach the maximum value, the laser source controller controls the laser source 110 to emit laser, and the angle $\theta$ between the first plane and the laser following emitted by the laser source 110 is increased with respect to the current angle $\theta$.

8. The 3D camera device of claim 1, wherein the laser source is capable of emitting laser in a range within the viewing angle W of the image sensor, and the range within the viewing angle W of the image sensor is divided into H×V pixel regions arranged in a matrix; the laser beams emitted by the laser source have a linear cross section, and each linear laser is emitted toward at least one column of the pixel regions along the vertical direction or at least one row of pixel regions along the horizontal direction, wherein the at least one column of pixel regions or the at least one row of pixel regions is defined as an emitting area.

9. The 3D camera device of claim 8, wherein the laser source is capable of emitting linear laser beams one by one toward the emitting areas corresponding to the H×V pixel regions.

10. The 3D camera device of claim 8, wherein the laser source is capable of emitting linear laser beams simultaneously toward the emitting areas corresponding to the H×V pixel regions.

11. The 3D camera device of claim 10, wherein the H×V pixel regions are further divided into a plurality of parallel regions, and each of the plurality of parallel regions comprises a plurality of adjacent emitting areas; the laser source is capable of simultaneously emitting a plurality of linear laser, and each of a plurality of linear laser corresponds to one of the plurality of parallel regions; for each parallel region, the laser source is capable of emitting a plurality of linear laser beams one by one toward a plurality of emitting regions of each parallel region, and the angle θ between the first plane and the linear laser beams gradually increases or decreases with the emitting order.

12. The 3D camera device of claim 10, further comprising a laser source controller electrically coupled to the laser source, wherein the laser source is capable of emitting a plurality of linear laser beams having a first intensity and a second intensity different from the first intensity; the laser source controller is configured to control the intensities of the plurality of linear laser beams according to intensity control signals, and each linear laser has the first intensity or the second intensity; in a sensing period T, the laser source controller controls the number of times that the laser source simultaneously emits the plurality of linear laser beams toward the plurality of emitting regions of the H×V pixel regions is k times, the image sensor generates a depth image signal according to the laser beams of k times reflected by the target object; the intensity control signal corresponding to each linear laser is a k-bit binary code, 1 of the k-bit binary code corresponds to the first intensity, 0 of the k-bits binary code corresponds to the second intensity, the k-bit binary codes of the light intensity control signals corresponding to the plurality of linear laser beams are different from each other.

13. The 3D camera device of claim 12, wherein the number S of the emitting areas and the number of times k satisfies a formula: $S=2^k-2$, and the k-bit binary code does not include a binary code containing all 0 or all 1.

14. The 3D camera device of claim 10, wherein the laser source is capable of emitting a plurality of linear laser beams having a first intensity and a second intensity different from the first intensity; the laser source comprises a laser-emitting element and a laser control element located in optical paths of the laser emitted by the laser-emitting element; the laser control element comprises k grating masks, each grating mask includes a first region for linear laser having the first intensity and a second region for linear laser having the second intensity; the first region and the second region correspond to the plurality of emitting areas; the laser emitted to the emitting areas by the first region has the first intensity, and the laser emitted to the emitting area by the second region has the second intensity; the plurality of linear laser beams are simultaneously emitted toward the plurality of emitting areas of the H×V pixel regions by passing through each grating mask, and the patterns of the grating masks are different from each other; the laser-emitting element is powered on during a sensing period T, and the laser-emitting element is capable of emitting the plurality of linear laser beams toward the plurality of emitting regions by the k grating masks one by one.

15. The 3D camera device of claim 14, wherein the k grating masks are located on a substrate along a circumferential direction of the substrate; the substrate is rotated along center of the circumference such that the k grating masks are sequentially located in the optical path of the laser emitted by the light-emitting element.

* * * * *

UNITED STATES PATENT AND TRADEMARK OFFICE
CERTIFICATE OF CORRECTION

PATENT NO. : 10,841,565 B2  
APPLICATION NO. : 15/942625  
DATED : November 17, 2020  
INVENTOR(S) : Hsien-Ying Chou Page 1 of 1

It is certified that error appears in the above-identified patent and that said Letters Patent is hereby corrected as shown below:

On the Title Page

Please replace item (73) "Assignee" with the following:
(73) Assignee: Interface Technology (ChengDu) Co., Ltd., Chengdu (CN);
INTERFACE OPTOELECTRONICS (SHENZHEN) CO., LTD., Shenzhen (CN);
GENERAL INTERFACE SOLUTION LIMITED, ZHUBEI (TW)

Signed and Sealed this  
Twenty-fifth Day of October, 2022

Katherine Kelly Vidal  
*Director of the United States Patent and Trademark Office*